US010752293B2

(12) United States Patent
Rawlings

(10) Patent No.: US 10,752,293 B2
(45) Date of Patent: Aug. 25, 2020

(54) BODY MOUNT

(71) Applicant: The Pullman Company, Milan, OH (US)

(72) Inventor: Scott W. Rawlings, North Ridgeville, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 16/403,899

(22) Filed: May 6, 2019

(65) Prior Publication Data

US 2019/0322320 A1 Oct. 24, 2019

Related U.S. Application Data

(63) Continuation of application No. 15/667,941, filed on Aug. 3, 2017, now Pat. No. 10,300,953.

(51) Int. Cl.
*F16F 13/10* (2006.01)
*B62D 23/00* (2006.01)
(Continued)

(52) U.S. Cl.
CPC .......... *B62D 23/005* (2013.01); *B62D 24/02* (2013.01); *B62D 25/088* (2013.01); *F16F 13/101* (2013.01); *F16F 13/105* (2013.01); *F16F 13/106* (2013.01); *B62D 21/11* (2013.01); *B62D 33/077* (2013.01); *F16F 3/0876* (2013.01)

(58) Field of Classification Search
CPC ...... F16F 3/0876; F16F 13/106; F16F 13/105; F16F 13/101; B62D 23/005; B62D 24/02; B62D 25/088; B62D 33/077; B62D 21/11
See application file for complete search history.

(56) References Cited

U.S. PATENT DOCUMENTS 2,540,130 A 2/1951 Lee
4,662,760 A 5/1987 Powell
(Continued)

FOREIGN PATENT DOCUMENTS

CN 105697629 A 6/2016
EP 1258650 A2 11/2002

OTHER PUBLICATIONS

International Search Report and Written Opinion dated Nov. 9, 2018 for PCT/US2018/043813 claiming benefit of U.S. Appl. No. 15/667,941, filed Aug. 3, 2017.

*Primary Examiner* — Melody M Burch
(74) *Attorney, Agent, or Firm* — Harness Dickey & Pierce

(57) ABSTRACT

A body mount comprises a first support member defining a first support surface adapted to engage a body of a vehicle. A second support member includes a second support surface adapted to engage a frame of the vehicle. A connector member is positioned between a cover and the second support member. The connector member includes a channel support including a channel having an inlet and an outlet. A central member is fixed to the first support member and moveable relative to the second support member. The cover and the connector member define a first chamber. The connector member and the second support member define a second chamber. The chambers are fluidly connected via the channel. The channel circumferentially extends about the central member. Movement between the central member and the second support member causes fluid to travel through the inlet, channel, and outlet to transfer fluid between the chambers.

16 Claims, 5 Drawing Sheets

(51) Int. Cl.
*B62D 24/02* (2006.01)
*B62D 25/08* (2006.01)
*F16F 3/087* (2006.01)
*B62D 33/077* (2006.01)
*B62D 21/11* (2006.01)

(56) References Cited

U.S. PATENT DOCUMENTS

| | | |
|---|---|---|
| 4,681,306 A | 7/1987 | Hofmann et al. |
| 4,932,636 A | 6/1990 | Phillips et al. |
| 5,060,917 A | 10/1991 | DuBos et al. |
| 5,127,636 A | 7/1992 | Spaltofski |
| 7,552,916 B1 | 6/2009 | Williams et al. |
| 7,584,944 B2 | 9/2009 | Goudie |
| 7,637,486 B2 | 12/2009 | Goudie |
| 7,922,156 B2 | 4/2011 | Goudie |
| 8,061,694 B2 | 11/2011 | Sugimoto |
| 8,177,201 B2 | 5/2012 | Goudie |
| 8,231,115 B2 | 7/2012 | Goudie et al. |
| 9,097,310 B2 | 8/2015 | Gaspar |
| 9,133,903 B2 | 9/2015 | Goossens et al. |
| 9,441,704 B2 | 9/2016 | Gaspar et al. |
| 2002/0070489 A1 | 6/2002 | Tanaka |
| 2005/0073166 A1 | 4/2005 | Snyder |
| 2006/0261531 A1 | 11/2006 | Kim |
| 2008/0029942 A1 | 2/2008 | Kern |
| 2008/0296817 A1 | 12/2008 | Shand et al. |
| 2009/0102218 A1 | 4/2009 | Fernandez et al. |
| 2009/0160111 A1 | 6/2009 | Goudie |
| 2011/0057366 A1 | 3/2011 | Bradshaw et al. |
| 2012/0061890 A1 | 3/2012 | Goudie |
| 2013/0038006 A1 | 2/2013 | Saito et al. |
| 2019/0039654 A1 | 2/2019 | Rawlings |

BODY MOUNT

CROSS-REFERENCE TO RELATED APPLICATIONS

This application is a continuation of U.S. patent application Ser. No. 15/667,941 filed on Aug. 3, 2017. The entire disclosure of the above application is incorporated herein by reference.

FIELD

The present disclosure relates to body mounts, subframe mounts, engine mounts or other similar mounting systems. More particularly, the present disclosure relates to a body mount for systems requiring a low profile and restricted packaging space.

BACKGROUND

This section provides background information related to the present disclosure which is not necessarily prior art.

Fluid filled vibration damping mounts are utilized for automotive engine mounts, subframe mounts and body mounts. These damping mounts couple two components together while damping the vibrations between the components. Typically, there are two support surfaces that are precompressed against each other prior to the working load being applied to the mounting system. Often the amount of packaging space for such mounts is limited. There exists a need for mounts that fit into such restricted packaging spaces while providing desired damping and travel-limiting characteristics.

SUMMARY

This section provides a general summary of the disclosure, and is not a comprehensive disclosure of its full scope or all of its features.

A body mount comprises a first support member defining a first support surface adapted to engage a body of a vehicle. A second support member includes a second support surface adapted to engage a frame of the vehicle. A connector member is positioned between a cover and the second support member. The connector member includes a channel support including a channel having an inlet and an outlet. A central member is fixed to the first support member and moveable relative to the second support member. The cover and the connector member define a first chamber. The connector member and the second support member define a second chamber. The chambers are fluidly connected via the channel. The channel circumferentially extends about the central member. Relative movement between the central member and the second support member causes fluid to travel through the inlet, the channel, and the outlet to transfer fluid between the first chamber and the second chamber.

In one embodiment of the present disclosure, a hydraulic body mount for connection between a body and a frame of a vehicle includes a first support member that defines a first support surface that is adapted to engage the body of the vehicle. The mount also includes a cover member. The cover member includes a rigid canopy, an inner tube and a first elastomeric spring. The inner tube is connected to the first support member and it extends axially away from the first support surface along a central axis.

The mount, in this embodiment, further includes a connector member. The connector member includes a connector plate, a second elastomeric spring and a channel support. The channel support is joined to the connector plated by the second elastomeric spring and the connector plate and the connector plate includes a central aperture received over the inner tube.

The mount also includes a second support member. The second support member includes a sleeve, a third elastomeric spring and a rigid base. The rigid base is connected to the sleeve by the third elastomeric spring and defines a second support surface that is adapted to engage the frame of the vehicle. The mount still further includes a travel-limiting cup that is joined to the second support member at an axial distance away from the second support surface. The travel-limiting cup is disposed on a side of the second support member away from the first support surface and it includes an elastomeric limiting member and a washer. The elastomeric limiting member is connected to the washer.

The foregoing embodiment of a mount also includes a channel that is defined by the channel support that is connected to the second support member. The mount includes a first chamber defined by the first elastomeric spring and the second elastomeric spring and a second chamber defined by the second elastomeric spring and the third elastomeric spring. The first chamber and the second chamber of the mount are fluidly connected via an aperture in the channel support to permit fluid to flow in the channel between the first chamber and the second chamber.

In another aspect of the present disclosure, the travel-limiting cup of the hydraulic body mount includes a rigid carrier and the elastomeric limiting member includes an inner portion and an outer portion. The inner portion of the elastomeric limiting member is connected to an inner surface of the rigid carrier and the outer portion of the elastomeric limiting portion is connected to the washer to define a cavity therebetween.

In another aspect of the present disclosure, the first chamber and the second chamber of the hydraulic body mount are disposed between the first support surface and the second support surface.

In another aspect of the present disclosure, the rigid base of the second support member includes a cup portion. The cup portion is disposed radially inward of the second support surface and it extends axially away from the second support surface. The travel-limiting cup is joined to the cup portion of the second support member.

In another aspect of the present disclosure, the travel-limiting cup surrounds an outer circumferential surface of the cup portion of the second support member.

In another aspect of the present disclosure, the third elastomeric spring includes a radial elastomeric member disposed in the cup portion of the second support member and it defines a void between the cup portion and the sleeve.

In another aspect of the present disclosure, the axial height of the void varies in at least two orthogonal directions around the sleeve.

In another aspect of the present disclosure, the elastomeric limiting member is V-shaped.

In another aspect of the present disclosure, the inner wall of the outer portion of the elastomeric limiting member and an outer wall of the inner portion of the elastomeric limiting member are angled toward each other such that the cavity is tapered.

In another aspect of the present disclosure, at least part of the inner portion of the elastomeric limiting member is disposed between the washer and the lower support surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
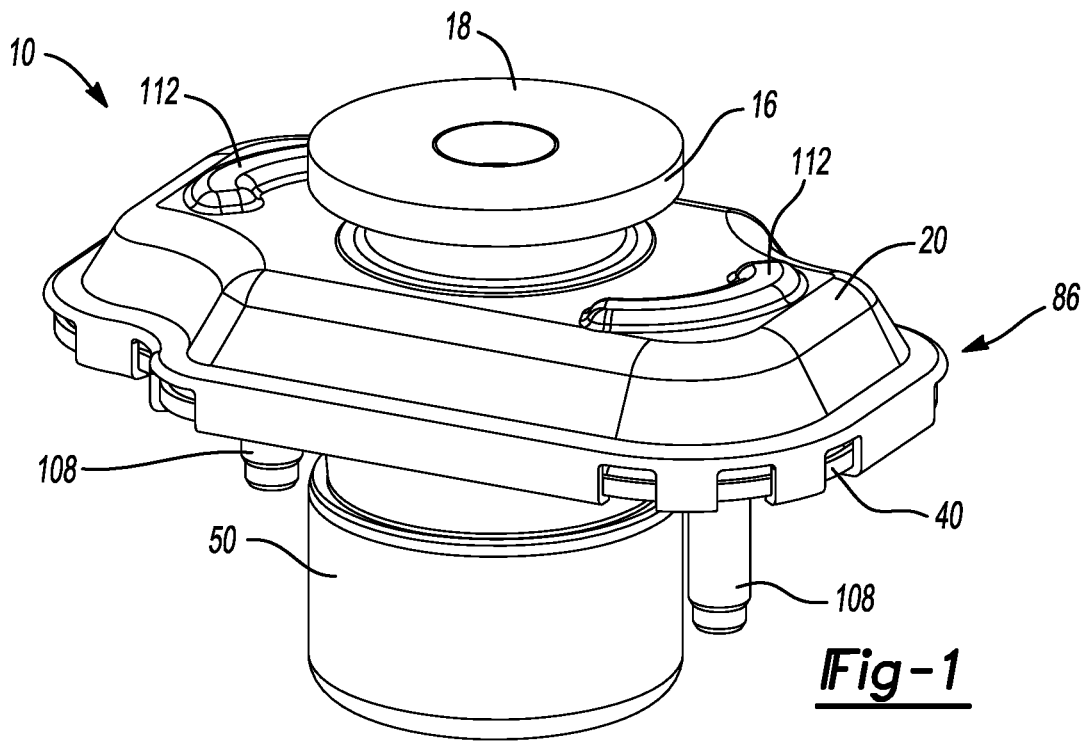
FIG. 1 is a perspective view of one embodiment of a mount of the present disclosure.
Figure 2:
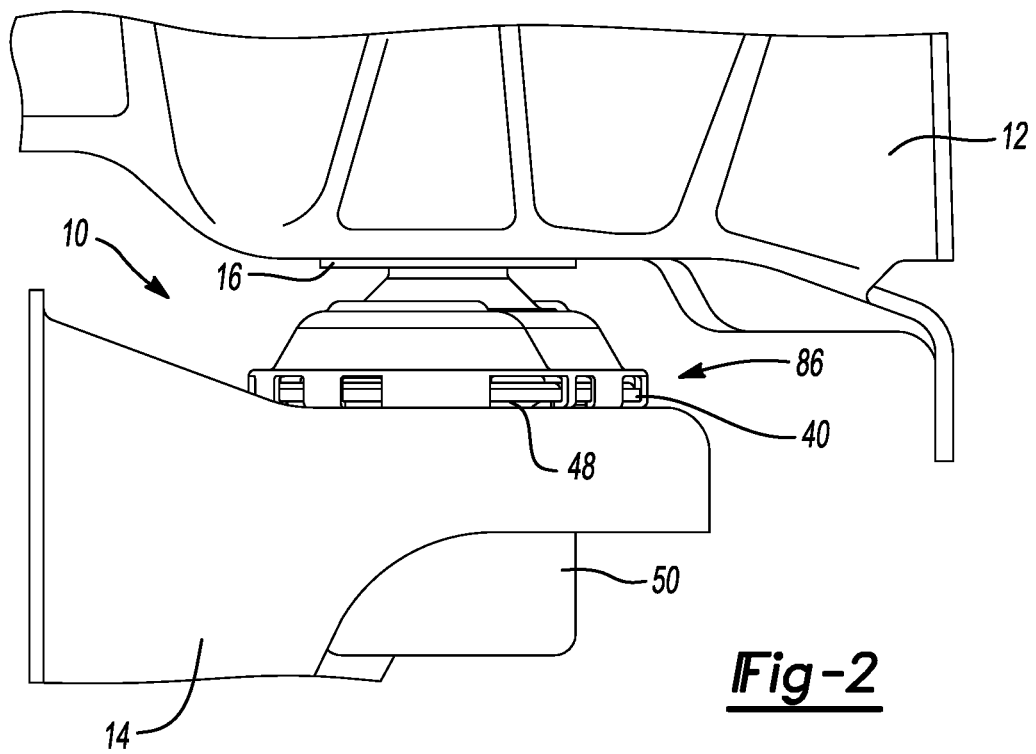
FIG. 2 is a rear view of the embodiment of the mount of FIG. 1 shown attached to the body and frame of a vehicle.

One example mount 10 in accordance with the present disclosure is shown in FIG. 1. Mount 10 may include a first support member 16, a cover member 20, a connector member 30, a second support member 40, a travel-limiting cup 50, and a damping system 86. One example application of mount 10 is shown in FIG. 2. As can be seen, mount 10 can be connected to a vehicle between a body 12 and a frame 14 of a vehicle. In other applications, mount 10 can be placed between other adjoining members in order to provide the vibration damping that will be explained in more detail below.

The mount 10 includes first support member 16 that is connected to the body 12 of the vehicle. First support member 16 includes a first support surface 18. First support surface 18 is the surface of first support member 16 adjacent body 12. First support surface 18 is a substantially planar surface and, in this example, is an annular surface. In the orientation shown in FIG. 2, first support surface 18 is disposed at the top of mount 10 and the other elements extend away, or downwardly, from first support surface 18.

Figure 3:
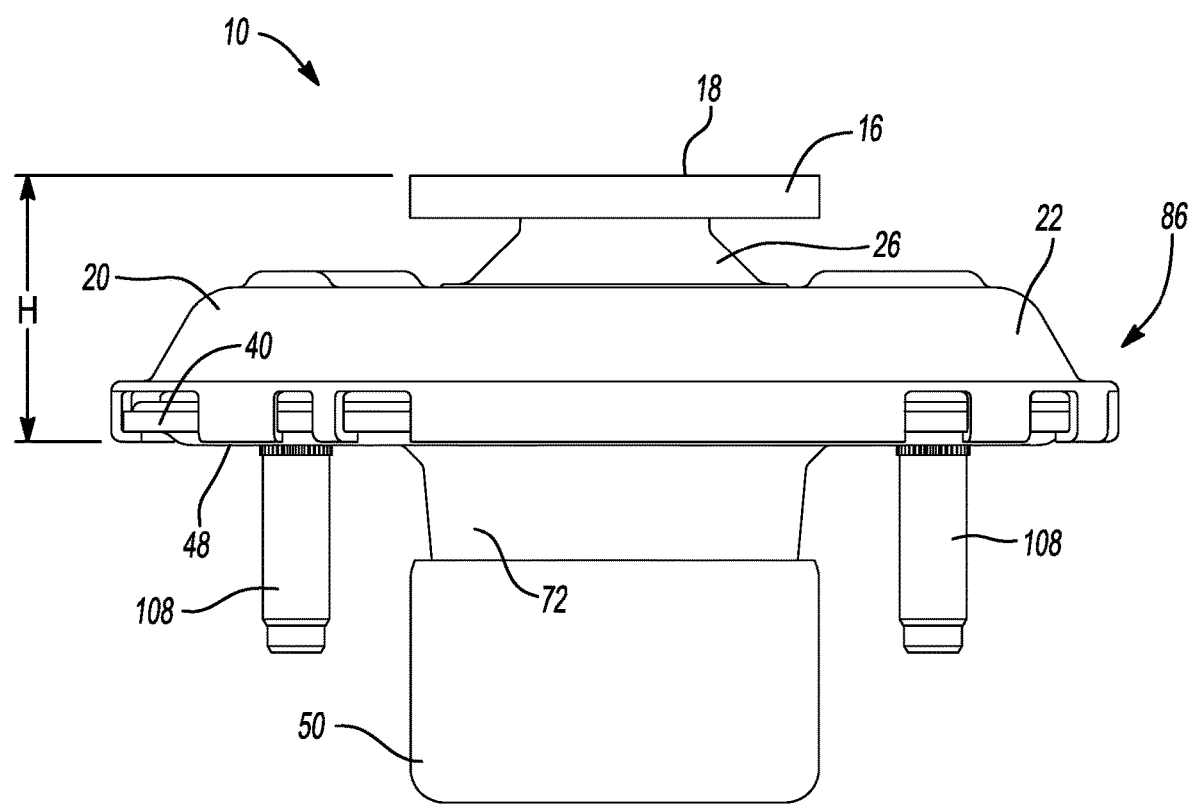
FIG. 3 is a side view of the mount of FIG. 1.

As further shown in FIGS. 2 and 3, second support member 40 is connected to frame 14. The surface of second support member 40 that is located adjacent to frame 14 is second support surface 48. Second support surface 48 is disposed on a bottom side of second support member 40. As can be seen, second support surface is substantially parallel to first support surface 18. In this configuration, hydraulic damping system 86 is positioned between first support surface 18 and second support surface 48 such that hydraulic damping system 86 is also positioned between first support surface 18 and second support surface 48. In this manner, the vibration damping functionality of mount 10 can be realized when load is exerted on mount 10 through body 12 or frame 14 through the attachment points at first support surface 18 or second support surface 48, respectively.

As can further be seen in FIGS. 1-4, second support member 40 includes cup portion 72. Cup portion 72 extends below and away from second support surface 48. Travel-limiting cup 50 is joined to cup portion 72 at the bottom of cup portion 72 at an overlapping region 74. As such, travel limiting cup 50 also is positioned below and away from second support surface 48. As will be explained in further detail below, this configuration of mount 10 permits elements of mount 10 to be located below second support surface 48 so that they are not located in the region between first support surface 18 and second support surface 48. The amount of packaging space that exists between body 12 and frame 14 can be limited in some applications. By positioning elements of mount 10 outside of the region between first support surface 18 and second support surface 48, the amount of necessary space for mount 10 can be advantageously reduced.

As shown in FIG. 3 and as previously described, first support surface 18 and second support surface 48 are substantially parallel to each other. The axial distance between first support surface 18 and second support surface 48 is shown as height H. In existing designs of mounts, height H can often be 50 mm or more. This size of a mount is not suitable for all applications and mounts with smaller heights are needed. By positioning one or more elements of mount 10 outside of the region between first support surface 18 and second support surface 48, height H can be reduced. In the example shown and described herein, height H can be reduced to 41 mm in a free, unloaded state and to 38 mm in a loaded state. This reduction is achieved, in part, by locating cup portion 72 of second support member 40 and travel-limiting cup 50 below second support surface 48.

Figure 4:
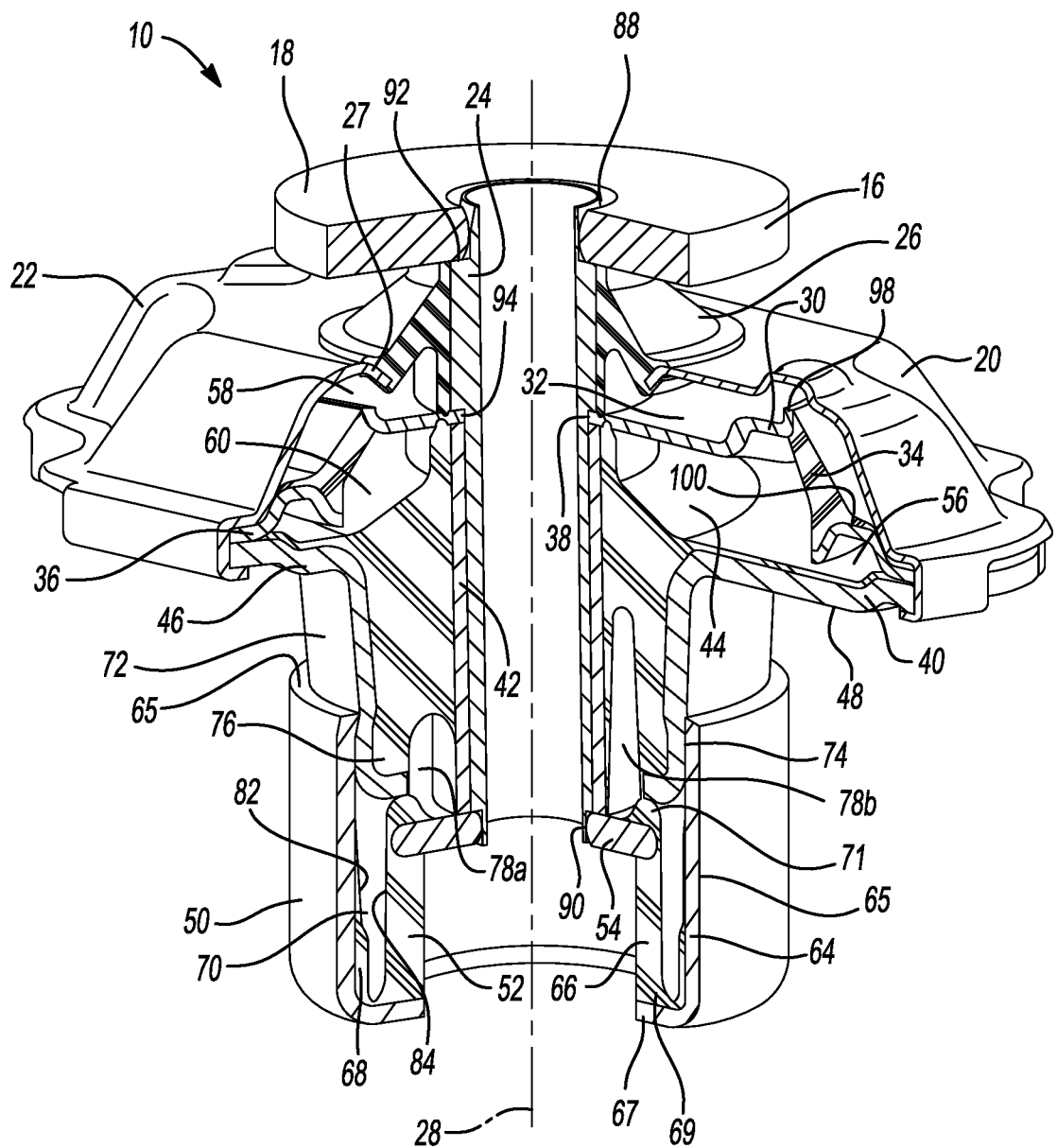
FIG. 4 is a partial sectional perspective view of the mount of FIG. 1 cut along two orthogonal planes.

Referring now to FIG. 4, a sectional view of mount 10 is shown. An inner tube 24 runs down the center of mount 10 and is connected to first support member 16 at proximal end 88. Inner tube 24 extends downwardly away from first support surface 18 to terminal end 90. Washer 54 of travel-limiting cup 50 is joined to the terminal end 90 of inner tube 24. In this arrangement, inner tube 24 is the central member to which many of the other elements of mount 10 are connected and arranged. Inner tube 24 is a substantially cylindrical member with a central axis 28.

First support member 16 is connected to inner tube 24 and is seated on inner tube 24 at first shoulder 92. This permits loads that are exerted on first support member 16 to be efficiently transferred to inner tube 24 and, in turn, to the other elements of mount 10. A first elastomeric spring 26 is joined to the outer surface of inner tube 24 at a position axially below first shoulder 92. First elastomeric spring 26 radially extends outward from central axis 28 and surrounds inner tube 24. First elastomeric spring 26 also extends downward and away from first support surface 18. As can be seen, this results in a conical shape of first elastomeric spring 26.

As further shown in FIG. 4, a rigid canopy 22 is connected to the radially outward edge of first elastomeric spring 26. In one example, rigid canopy 22 may include an inner flange 27 that is over molded by and fixed to first elastomeric spring 26. Rigid canopy 22 extends radially outward before turning downward and away from first support surface 18. An outer lower edge 114 (FIG. 7) of rigid canopy 22 is connected to a rigid base 46 of second support member 40. As can be seen, rigid canopy 22 and rigid base 46 encapsulate many of the other elements of the mount 10 as will be further described.

Further connected to inner tube 24 is a connector plate 32. Connector plate 32 includes a central opening 38 that is received over inner tube 24 such that connector plate is seated on inner tube 24 at a second shoulder 94 located axially below first shoulder 92. Connector plate 32 is a rigid member of mount 10 and extends radially outward from central axis 28. A second elastomeric spring 34 is joined to an outer peripheral edge 98 of connector plate 32. As can be seen, the outer peripheral edge 98 of connector plate 32 resides radially inward of the location where rigid canopy 22 turns downward away from first support surface 18. This profile of connector plate 32 permits second elastomeric spring 34 to extend radially outward and downward from outer peripheral edge 98. Second elastomeric spring 34 is then joined to a channel support 36.

Channel support 36 is also a rigid element of mount 10. Channel support 36 extends radially outward of second elastomeric spring 34 and is connected and compressed between rigid canopy 22 and rigid base 46. Channel support 36 includes a raised track 100 that defines channel 56 as will be explained in more detail below.

As further shown in FIG. 4, mount 10 also includes a sleeve 42 surrounding inner tube 24. Sleeve 42 is a substantially cylindrical element that is received over inner tube 24. As such, an inner diameter of sleeve 42 is slightly larger than an outer diameter of inner tube 24. A third elastomeric spring 44 is joined to an outer diameter of sleeve 42 and extends radially outward and is further joined to second support member 40.

Certain elements of mount 10 combine to create a hydraulic damping system 86. In particular, first elastomeric spring 26, rigid canopy 22, channel support 36, second elastomeric spring 34 and connector plate 32 combine to define a first chamber 58. Connector plate 32, second elastomeric spring 34 and third elastomeric spring 44 combine to define second chamber 60. A portion of the volume defined by first chamber 58 and second chamber 60 is filled with a non-compressible fluid that is permitted to travel between first chamber 58 and second chamber 60 to provide damping of vibrations imposed on mount 10 via its connections at first support surface 18 and second support surface 48.

Figure 5:
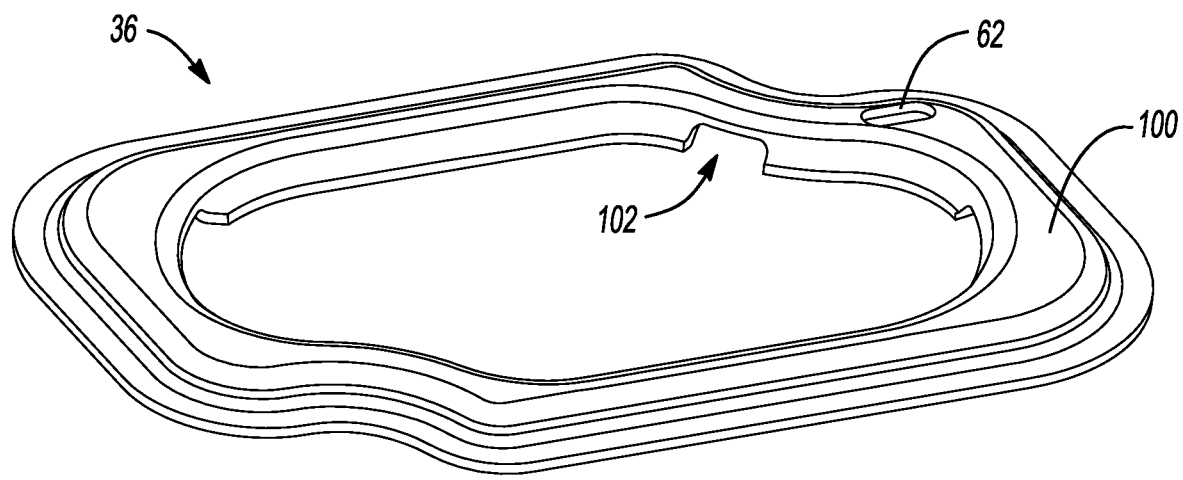
FIG. 5 is a perspective view of one embodiment of a channel support of the present disclosure.
Figure 6:
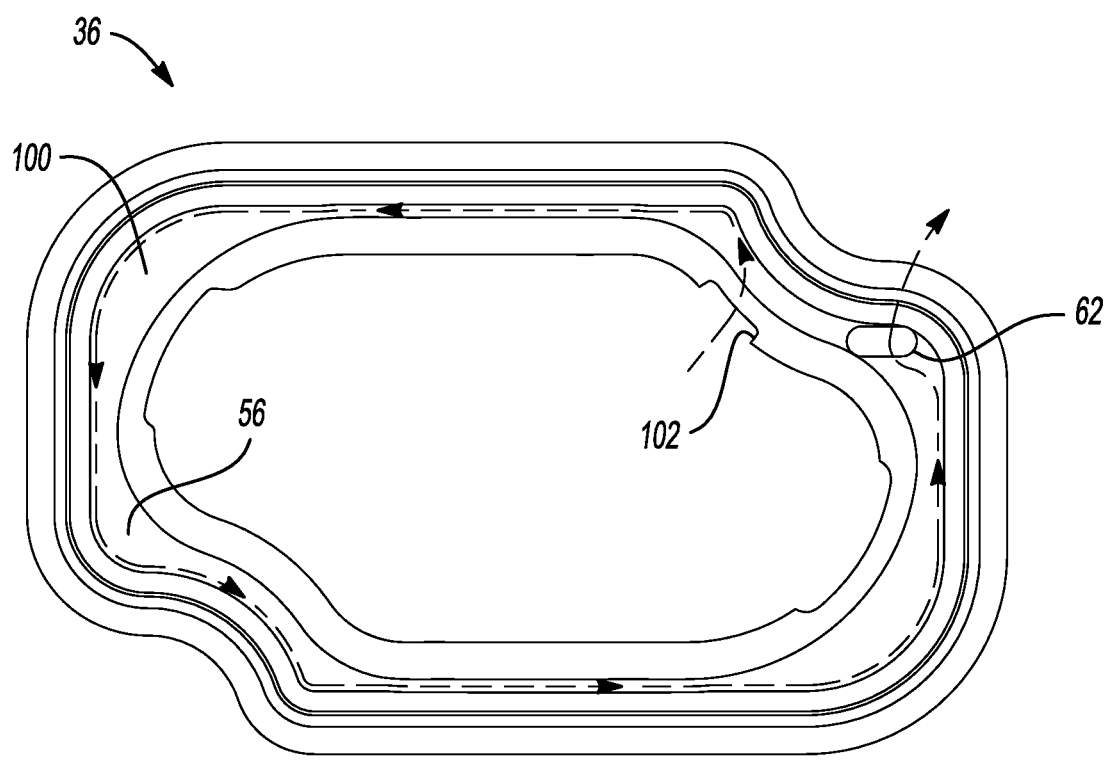
FIG. 6 is a top view of the channel support of FIG. 5.

Fluid is permitted to travel between first chamber 58 and second chamber 60 via channel 56 defined by channel support 36. As shown in FIGS. 5 and 6, channel support 36 includes track 100 that is a raised portion of channel support 36 that is formed into channel support 36. Channel support 36 also includes a slot 102 and an aperture 62. Slot 102 is a gap in track 100 that fluidly connects second chamber 60 to channel 56. Aperture 62 is an opening in channel support 36 that fluidly connects channel 56 to first chamber 58. As can be appreciated and when the pressure in second chamber 60 is higher than the pressure in first chamber 58, fluid that is located in second chamber 60 flows into channel 56 via slot 102. The fluid then flows around channel support 36 through channel 56 before reaching aperture 62. Upon reaching aperture 62, the fluid can further flow into first chamber 58. As can be further appreciated, fluid can flow in the reverse direction if the pressure in first chamber 58 is higher than the pressure in second chamber 60.

Figure 7:
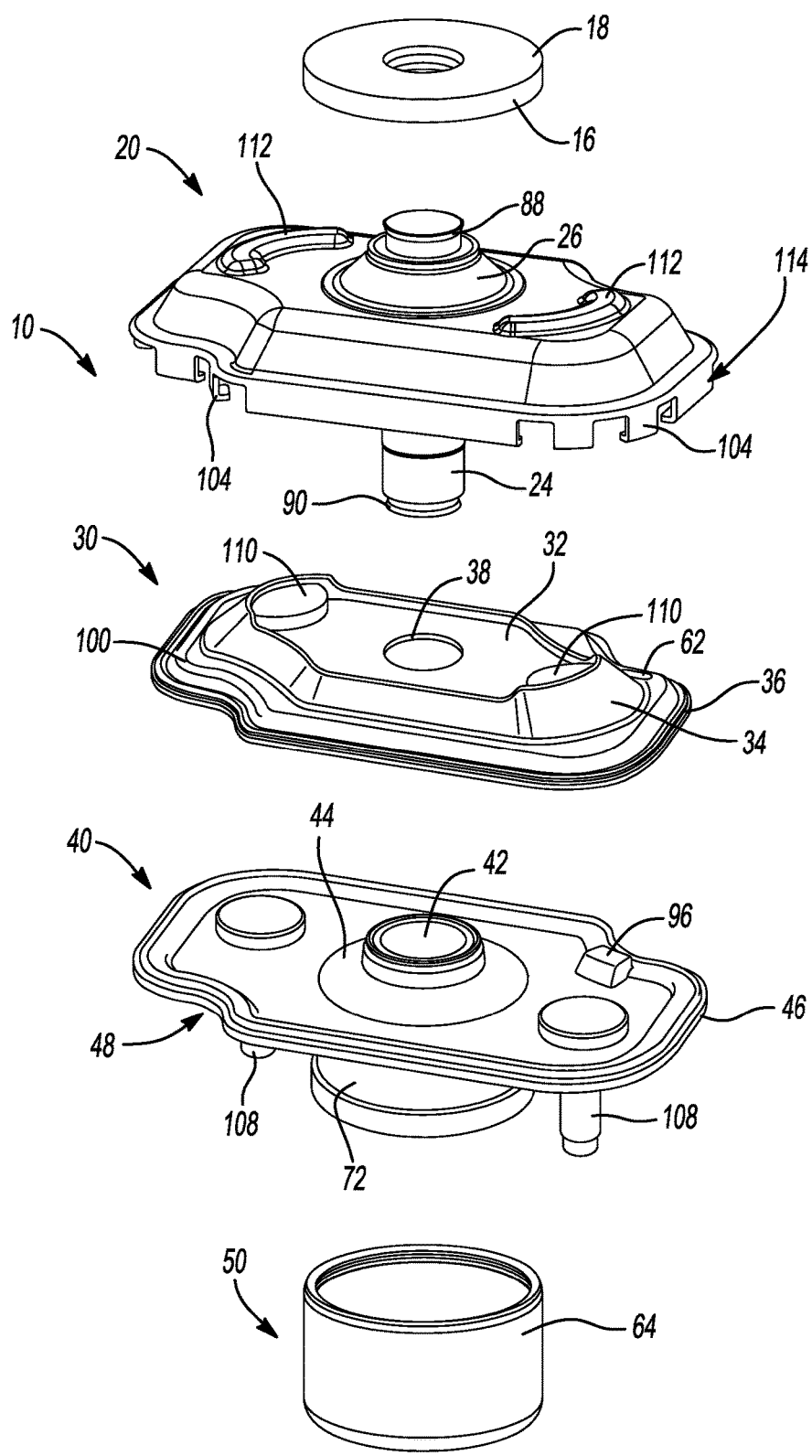
FIG. 7 is a partial exploded view of the mount of FIG. 1.

The damping characteristics of mount 10 can be varied and tuned by changing various aspects of hydraulic damping system 86. Some aspects of the system that can be changed or varied in order to tune or modify the damping characteristics include the length of channel 56 and the size, quantity and location of slot(s) 102 and aperture(s) 62. As shown in FIG. 6, the fluid in mount 10 is forced to flow around the length of channel 56 defined by track 100 in channel support 36. The fluid flows in the direction shown because a channel barrier 96 (as shown in FIG. 7) can be included in second support member 40. Channel barrier 96, in the example shown, is a projection of elastomeric material that fills channel 56 in the region between slot 102 and aperture 62. Channel barrier 96 is pressed into channel 56 during assembly of mount 10 and forces fluid to flow around channel 56 in the direction indicated by the arrows on FIG. 6. As can be appreciated, the length of channel 56 between slot 102 and aperture 62 affects the flow of the fluid from first chamber 58 to second chamber 60 and, in turn, affects the damping characteristics of mount 10. In other embodiments of mount 10, the length of channel 56 can be varied or additional slots 102 and/or additional apertures 62 can be included in channel support 36 to change the damping effects of hydraulic damping system 86.

As previously described, rigid base 46 of second support member 40 includes second support surface 48 and cup portion 72. Cup portion 72 is a portion of rigid base 46 located radially inward of second support surface 48 that extends downward and away from second support surface 48. Cup portion 72 extends downward but does not extend beyond terminal end 90 of inner tube 24.

As shown in FIG. 4, radial elastomeric member 76 is located in the cup portion 72 of rigid base 46 below third elastomeric spring 44. Radial elastomeric member 76 is connected to sleeve 42 and cup portion 72 of rigid base 46. An inner surface of radial elastomeric member 76 and an outer surface of sleeve 42 define a void 78 (shown as 78a and 78b). As shown in FIG. 4, the size of void 78 may vary around central axis 28. In the example mount 10 shown, the axial height of void 78 changes around central axis 28. The height of void 78 transitions from a height as shown at 78a to the longer height shown at 78b. The height at void 78a is substantially less than the height at void 78b. In this example, differing heights are oriented orthogonally to each other and are substantially oriented in a forward and transverse direction with respect to the vehicle to which mount 10 is attached. This orientation provides desired damping effects in response to inputs that transferred to mount 10 in the forward and transverse directions of the vehicle to which mount 10 is connected. The size of void 78 can be changed from the example shown to provide other desired vibration damping effects such as in different direction or to vary the amplitude of such damping effects.

As further shown in FIG. 4, travel-limiting cup 50 is positioned at the bottom of mount 10 opposite first support surface 18. Travel-limiting cup 50 includes a rigid carrier 64, an elastomeric limiting member 52 and washer 54. Rigid carrier 64 includes a cylindrical body portion 65 and a flange 67. Body portion 65 has an inner diameter that is larger than the outer diameter of cup portion 72 of rigid base 46. Body portion 65 of rigid carrier 64 surrounds and is connected to cup portion 72 at overlapping region 74. Travel-limiting cup 50 includes elastomeric limiting member 52 that is connected to the inner surface of rigid carrier 64. Elastomeric limiting member 52 is further connected to washer 54. Washer 54 is an annular component with a hole at its center. This hole of washer 54 fits over the terminal end 90 of inner tube 24 and connected thereto. Washer 54 is connected to elastomeric limiting member 52 at a position axially upward of flange 67 of rigid carrier 64. In this manner, washer 54 is connected to mount 10 at a position between second support surface 48 and the bottom of rigid carrier 64.

The elastomeric limiting member 52 includes an inner portion 66 and an outer portion 68. Inner portion 66 is substantially cylindrical having a first end 69 connected to flange 67 of rigid carrier 64 and a second opposite end 71 connected to washer 54. Outer portion 68 is fixed to body portion 65. As shown, an inner wall 82 of outer portion 68 and an outer wall 84 of inner portion 66 define a cavity 70.

Cavity 70 is tapered space between inner portion 66 and outer portion 68 that resides circumferentially around and below washer 54.

Travel-limiting cup 50 is configured to limit the amount of travel permitted by mount 10. As can be appreciated, as a load is exerted at first support surface 18, the elastomeric elements of mount 10 permit first support surface 18 to move toward second support surface 48 (downward as oriented in FIG. 2). When such an event occurs, washer 54 moves downward and away from second support surface 48. As washer 54 moves downward and away from second support surface 48, the inner portion 66 of elastomeric limiting member 52 is compressed between washer 54 and flange 67 of rigid carrier 64. If the load is large enough and the travel of washer 54 in the axial direction toward flange 67 of rigid carrier 64 reaches a threshold level, the tapered annular column of inner portion 66 of elastomeric limiting member 52 is permitted to buckle toward outer portion 68. In this manner, the buckled inner portion 66 of elastomeric limiting member 52 fills cavity 70 and such movement of washer 54 is limited from further axial downward movement. The size and shape of rigid base 46, elastomeric limiting member 52 and cavity 70 can be varied and tuned according to desired vibration damping characteristics and desired travel limiting characteristics of mount 10.

FIG. 7 shows an exploded view of the example mount 10 of the present disclosure. In this view, the previously described components are shown in various sub-assemblies as they may be arranged during an example assembly process of mount 10. As described, first support member 16 can be an annular member with a center hole that fits over inner tube 24. Inner tube 24 can be sub-assembled as part of cover member 20. In this example, cover member 20 includes first elastomeric spring 26 and rigid canopy 22 in addition to inner tube 24. In the pre-assembled state, rigid canopy 22 can include one or more fingers or flanges 104 that can be later crimped around adjoining members such as connector member 30 and second support member 40.

As further shown, connector member 30 can be installed over inner tube 24. Connector member 30 includes connector plate 32, second elastomeric spring 34 and channel support 36. Connector member 30 is compressed between cover member 20 and second support member 40.

Second support member 40, as shown, includes sleeve 42, third elastomeric spring 44 and rigid base 46. As further shown, second support member 40 may also include one or more studs 108 that can be welded or otherwise joined to rigid base 46 in order to connect second support surface 48 to frame 14 or other mounting location. As previously described, fingers or flanges 104 of rigid canopy 22 can be crimped over and around second support member 40 with connector member 30 positioned in between in order to secure the sub-assemblies in position.

Travel-limiting cup 50 is also shown in FIG. 7. As previously described, travel-limiting cup 50 includes rigid carrier 64, elastomeric limiting member 52 and washer 54. Travel-limiting cup 50 can be joined to mount 10 by installing washer 54 over the terminal end 90 of inner tube 24 and crimping, swaging or otherwise securing the washer to inner tube 24. This in turn secures the upper edge of rigid carrier 64 in position surrounding the outer circumferential surface of cup portion 72 of second support member 40.

As can be seen in FIGS. 1 and 7, mount 10 may be configured with an elongated profile that is not symmetrical about central axis 28. In other embodiments other profiles may be used. As further shown, mount 10 may include one or more relief features or one or more projections that provide clearance between mount 10 and neighboring components. The one or more relief features or projections may also be included on various components of mount 10 to provide clearance between adjacent parts. As can be appreciated, as mount 10 is subjected to loading and vibration, the various components may move relative to one another due to elastic deformation that may occur. Stud reliefs 110, for example, are included in connector plate 32 to provide clearance to studs 108 so that connector member 30 does not contact second support member 40 when the two members move relative to one another. Similarly, rigid canopy 22 includes one or more connector reliefs 112 that provide clearance between first support member 16 and connector member 30 that may move relative to one another during loading and vibration of mount 10.

As described above, mount 10 includes components described as elastomeric and as rigid. For the purposes of this disclosure, these terms are used in a relative basis and generally mean that the rigid components do not undergo significant elastic deformation in normal use while the elastomeric components are intended to undergo elastic deformation during normal use. In the example shown, the rigid components can be stamped or otherwise formed of high strength steel, such as SAE J2340 grade steel. The elastomeric components can be made of suitable natural or artificial rubber, such as a natural rubber with a durometer between 50 and 60. Other suitable materials can be used. Elastomeric components may be fixed or joined to rigid components using any number of methods including adhesive bonding, overmolding, mechanical fastening and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A body mount for connection between a body and a frame of a vehicle, comprising:
   a first support member defining a first support surface adapted to engage the body of the vehicle;
   a second support member including a second support surface adapted to engage the frame of the vehicle;
   a cover;
   a connector member positioned between the cover and the second support member, the connector member comprising a channel support including a channel having an inlet and an outlet; and
   a central member fixed to the first support member and being moveable relative to the second support member, wherein the cover and the connector member define a first chamber, the connector member and the second support member defining a second chamber, the first chamber and the second chamber being fluidly connected via the channel of the channel support, wherein the inlet of the channel is positioned in communication with the first chamber and the outlet of the channel is positioned in communication with the second chamber, the channel circumferentially extending about the central member, wherein the second support member includes a barrier separating one portion of the channel from another portion of the channel such that relative movement between the central member and the second support member causes fluid to travel through the inlet, the channel, and the outlet to transfer fluid between the first chamber and the second chamber, wherein the connector member includes a connector plate fixed to the central member, wherein movement of the first support member and the central member also causes the connector plate to move, the connector plate being in direct contact with fluid positioned in each of the first chamber and the second chamber, movement of the connector plate causing fluid to flow through the inlet, the outlet and the channel to transfer fluid between the first chamber and the second chamber, wherein the connector plate and the channel support are interconnected by an elastomeric member.

2. The body mount of claim 1, wherein the connector member includes a peripheral lip sealingly engaged with a peripheral lip of the cover and a peripheral lip of the second support member.

3. The body mount of claim 1, wherein the central member extends through an aperture in the cover, an aperture in the connector member and an aperture in the second support member, the central member extending beyond the second support surface in a direction away from the cover.

4. The body mount of claim 1, wherein the cover includes a first elastomeric member having a first portion fixed to the central member, wherein the first elastomeric member is moveable relative to the channel support.

5. The body mount of claim 1, wherein the inlet and the outlet are in fluid communication with one another only via the channel.

6. The body mount of claim 1, wherein the first chamber and the second chamber are in fluid communication with one another only via the channel.

7. The body mount of claim 1, wherein the channel support includes a wall at least partially defining the channel, the channel support further including a slot extending therethrough at least partially defining the inlet.

8. The body mount of claim 7, wherein the channel support includes an aperture extending therethrough to define the outlet.

9. The body mount of claim 1, wherein the central member includes a hollow tube.

10. A body mount for connection between a body and a frame of a vehicle, comprising:
    a first support member defining a first support surface adapted to engage the body of the vehicle;
    a second support member including a second support surface adapted to engage the frame of the vehicle;
    a sealed housing including a cover and the second support member;
    a connector member positioned within the housing defining a first chamber between the cover and the connector member and a second chamber between the connector member and the second support member, the first support member being drivingly connected to the connector member such that movement of the first support member relative to the second support member causes the connector member to move within the housing;
    a channel support positioned within the housing including a channel having an inlet and an outlet, the inlet being in communication with the first chamber and the outlet being in communication with the second chamber;
    a barrier positioned within the channel between the inlet and the outlet, the barrier preventing a flow of fluid through the channel at the barrier position, wherein relative movement between the first support member and the second support member toward one another causes fluid to travel through the inlet, through the channel, and through the outlet in a single direction to transfer fluid between the first chamber and the second chamber, wherein the connector member includes a moveable connector plate and an elastomeric member, the elastomeric member interconnecting the connector plate and the channel support.

11. The body mount of claim 10, wherein the channel support includes a wall at least partially defining the channel, the wall circumferentially extending within the housing.

12. The body mount of claim 11, wherein the wall includes a first aperture extending therethrough at least partially defining an inlet and a second aperture extending therethrough to at least partially define the outlet.

13. The body mount of claim 10, wherein the inlet and the outlet are in fluid communication with one another only via the channel.

14. The body mount of claim 10, wherein an outer peripheral extent of the channel support sealingly engages an inner surface of the housing.

15. A body mount for connection between a body and a frame of a vehicle, comprising:
    a first support member defining a first support surface adapted to engage the body of the vehicle;
    a second support member including a second support surface adapted to engage the frame of the vehicle;
    a cover;
    a connector member positioned between the cover and the second support member, the connector member comprising a channel support including a channel having an inlet and an outlet; and
    a central member fixed to the first support member and being moveable relative to the second support member, wherein the cover and the connector member define a first chamber, the connector member and the second support member defining a second chamber, the first chamber and the second chamber being fluidly connected via the channel of the channel support, wherein the inlet of the channel is positioned in communication with the first chamber and the outlet of the channel is positioned in communication with the second chamber, the channel circumferentially extending about the central member, wherein the second support member includes a barrier separating one portion of the channel from another portion of the channel such that relative movement between the central member and the second support member causes fluid to travel through the inlet, the channel, and the outlet to transfer fluid between the first chamber and the second chamber, wherein the barrier includes an elastomeric material that fills the channel at a location between the inlet and the outlet.

16. The body mount of claim 15, wherein the location of the barrier defines a length of a fluid flow path between the inlet and the outlet, wherein the length of the fluid flow path defines a damping characteristic of the body mount.

\* \* \* \* \*